United States Patent [19]

Gladstone et al.

[11] Patent Number: 4,646,615

[45] Date of Patent: Mar. 3, 1987

[54] CARBON FIBRE GUN BARREL

[75] Inventors: David H. Gladstone, Quebec; Raymond Langlois, Loretteville; William J. Robertson, Sillery, all of Canada

[73] Assignee: Her Majesty the Queen in right of Canada, Canada

[21] Appl. No.: 705,112

[22] Filed: Feb. 25, 1985

[30] Foreign Application Priority Data

May 15, 1984 [CA] Canada .................................. 454284

[51] Int. Cl.$^4$ ........................ F41F 17/04; F41F 17/08
[52] U.S. Cl. ...................................... 89/15; 89/1.816; 89/16; 42/76.02
[58] Field of Search .................... 89/1.7, 1.816, 1.819, 89/15, 16; 42/96 R, 76 A

[56] References Cited

U.S. PATENT DOCUMENTS

| 2,847,786 | 8/1958 | Hartley et al. ................. 42/76 R |
| 3,298,279 | 1/1967 | Barnet et al. .................. 42/76 A X |
| 3,517,585 | 6/1970 | Slade ............................. 89/16 |
| 3,641,870 | 2/1972 | Eig ................................ 42/76 A |
| 4,485,721 | 12/1984 | Shankhla et al. ............... 89/15 |

FOREIGN PATENT DOCUMENTS

3212721 10/1983 Fed. Rep. of Germany .
1597423 8/1970 France .

Primary Examiner—David H. Brown
Attorney, Agent, or Firm—Stevens, Davis, Miller & Mosher

[57] ABSTRACT

A barrel section for a lightweight firearm such as a recoilless gun which is subjected to extremely high transient internal pressures and temperatures on firing is formed from an epoxy-resin impregnated carbon fibre material. The material, in the form of an elongated tow is wound on a mandrel, cured and then removed from the mandrel for subsequent operations such as machining and assembly. During manufacture, a gas-erosion preventing layer is formed on the mandrel and a plurality of layers of tow are helically-wound thereon at a helix angle $\theta = \tan^{-1}(\sigma_{axial}/\sigma_{hoop})$ where $\sigma_{axial}$ and $\sigma_{hoop}$ are the axial and hoop stresses produced in the barrel section by axial and hoop loads respectively. Lightweight recoilless guns using barrels in accordance with the invention are lighter and less costly to fabricate than conventional guns and are capable of firing upwards of 30 rounds before excessive erosion causes the firearm to be unusable. This is in comparison to a capability of firing only 5 to 10 rounds before failure for conventional guns. Failure is usually the result of the high pressures and temperatures encountered during firing, upwards of 9,000 p.s.i. and 3,000° K.

20 Claims, 11 Drawing Figures

FIG. 7 EFF. HOOP MODULUS AND BURST PRESSURE VS. WINDING ANGLE

FIG. 8 STRAINS AT BURST-HYDROSTATIC TESTS

DESIGN PLOT FOR A TYPICAL TUBE

FIG. 9

DESIGN PLOT FOR A TYPICAL TUBE

FIG. 10

CARBON FIBRE GUN BARREL

This invention relates to a structural element in the form of a tubular item made of a fibre reinforced composite material. More particularly, the invention relates to a barrel section for a lighweight firearm and to the method of making the same from a resin-treated carbon-fibre material.

BACKGROUND OF THE INVENTION

Steel and steel alloys have previously been used extensively in tubular structural elements, gun barrels, and the like, where continuous or transient internal pressures of high magnitude are encountered. In particular, machined or forged high-strength steel alloy tubes are used in forming gun barrels. Considerable precision and skill are required to manufacture a gun barrel by conventional processes leading to a fairly costly component. Some improvements have been suggested, particularly in attempts to reduce component weight and/or costs. The use of gun barrels fabricated wholly or partially by filament-winding a glass-fibre/epoxy composite, followed by curing, has been described previously, e.g., Canadian Pat. No. 582,160 of Aug. 25, 1959; U.S. Pat. No. 3,298,279 of Jan. 17, 1967; U.S. Pat. No. 2,847,786 of Aug. 19, 1958; and U.S. Pat. No. 3,517,585 of Jan. 30, 1970.

It is emphatically stated here, however, that all of these patents remain silent on the use of carbon-fibre/epoxy composite or describe a fully composite barrel which can fire no more than a few rounds. Indeed, U.S. Pat. No. 3,298,279 clearly states that a glass fibre/epoxy rifled barrel can fire only one round. Also, all previous patents remain silent on means for providing adequate stiffness to a fibre composite gun barrel or on the problems resulting from inadequate stiffness.

Notwithstanding the express teachings of the above patents, the present invention provides a number of advantages and features not previously known. The novel barrel sections described herein and the method of making the same are relatively inexpensive, light and provide good reliability. A gun barrel made entirely of the material described herein is useful and operative in certain applications where the prior art taught only the use of barrels that were wholly or at least partly metallic. The barrel sections described herein are light in weight, yet strong enough to withstand the transient high pressures generated in a gun system.

In particular, the barrel sections of this invention are very useful in a recoilless gun application. Typical recoilless guns in service, such as the U.S. 90 mm and 106 mm recoilless rifles, and the Swedish 84 mm Carl Gustaf recoilless rifle use costly, heavy, precision machined steel components. Other recoilless guns use glass-fibre/epoxy filament-wound material and are one-round, 'throw-away', weapons. An example of the latter type is the Swedish 84 mm AT-4. In contradistinction the present invention allows for the firing of 30 or more rounds before erosion of the inner surfaces of the barrel sections causes excessive degradation of weapon performance. Also, the gun barrel described herein may be used in other weapon systems such as field artillery pieces, rocket launchers, mortars, and other projectile launchers.

The advantages of the present invention may be best seen by comparing the performance of barrel sections fabricated as in the present invention and conventional sections. For example, the gun barrel of an 84 mm recoilless gun weighs 8.5 kg when fabricated from high-strength steel alloy and 2.8 kg when fabricated as per the teachings of the present invention. Operating pressures are about 9000 psi in both cases with the propellant gas temperature being about 3500° K. The muzzle velocity in both cases is about 305 m/sec with all aspects of weapon operation being identical. It should be noted that the barrel of the present invention was fabricated automatically using a microprocessor-controlled filament-winding machine without the need for extensive machinist intervention. The weight and fabrication cost reduction is most important as it allows for greater issue to soldiers who will be able to give it more extensive use than is possible with either a heavy steel gun or a glass-fibre/epoxy gun.

The present invention represents an improvement over the concepts enumerated in copending, commonly assigned U.S. Pat. No. 4,485,721, issued Dec. 4, 1984. That application introduced the concept of a gun barrel produced entirely from a filament-wound fibre reinforced composite material. The gun barrel was produced so as to have inwardly directed projections formed from lengths of the composite material, the projections defining rifling lands within the barrel. In contrast to the teachings of the prior application wherein the composite fibre material was helically wound on a mandrel so that the fibres were oriented in mutually stress transmitting relation to each other, the present invention recognizes that the manner in which the fibre material is wound or placed on the mandrel can greatly affect the effectiveness of the resulting weapon, as can other factors such as the type of fibre and resin, the tension placed on the fibre tow during winding, and the cure cycle. In addition, by appropriately configuring the windings it is possible to produce a gun barrel per se, with or without rifling lands, or any other tubular weapon system component subjected to very high transient gas pressures and hot propellant gas erosion of its inner surfaces.

SUMMARY OF THE INVENTION

The present invention, as mentioned above, is an improvement over that of the above-identified application. In this instance it has been determined that the lightest barrel section with adequate strength and hoop stiffness (i.e., stiffness in the hoop direction) can be achieved if a tow of resin-impregnated carbon fibres is wound on a mandrel, in sufficient layers, such that the average helical winding angle meets the requirements for an adequate ratio of axial to hoop strength, as determined from $\theta = \tan^{-1}(\sigma_{axial}/\sigma_{hoop})$ where $\sigma_{axial}$ and $\sigma_{hoop}$ are the axial and hoop stresses produced in the barrel section by axial and hoop loads, respectively, as well as adequate effective hoop modulus of elasticity (hoop stress divided by hoop strain), and adequate hoop burst strength. The wall thickness of the barrel section will be a minimum for optimum filament winding angle and will be a function of the design burst strength and hoop stiffness (the effective hoop modulus of elasticity multiplied by the wall thickness).

It is also very desirable to include one or more layers of material along the innermost diameter of the barrel section to resist hot gas erosion. For example, it has been shown that reasonable erosion resistance can be achieved by using four 90° hoop-wound layers to line the inner surface of the barrel section. Firing tests have shown that one layer of hoop-wound tow having a thickness of about 0.0065 inches erodes at the end of chamber/origin of rifling region of a gun barrel for each 15 rounds fired. By the time the hoop-wound layers have been eroded, about 60 rounds would have been fired and by that time other constraints, including excessive wear of the rifling lands and difficulty in extracting the cartridge case, would probably have rendered the gun ineffective.

It is possible to provide rifling grooves by having a plurality of longitudinally extending, slightly helically oriented, grooves in the mandrel and by filling those grooves with epoxy resin treated carbon fibre rovings before the carbon fibre tow is wound on the mandrel. After curing the rovings will have assumed the shape of the mandrel grooves and will define interior projections within the barrel, the projections defining therebetween the rifling grooves.

As an alternative to the hoop-wound layers it might be possible to use a carbon fibre fabric material having both warp and weft filaments as the gas-erosion preventing material. Such a fabric would be wound on the mandrel to an appropriate thickness before the helically-wound layers are wound thereover. Of course, it would also be possible to combine carbon-fibre fabrics with the hoop-wound tow to ensure even greater resistance to gas erosion.

In order to achieve a final weapon wherein the axial and hoop strengths are at least equal to those required, it has been determined that the tow should be wound on the mandrel under a constant tension of about 8 lbs. and that the helix angle for the helically-wound layers of tow syould be between 70° and 78° with an optimum angle being about 71°.

Broadly speaking therefore, the present invention may be considered to provide a barrel section for a lightweight weapon system subjected to high transient internal pressures and temperatures on firing, comprising a cured resin-treated multi-filament carbon fibre material which has been provided in a plurality of superimposed layers along the length of the section whereby at least the innermost layer of the material is configured to resist hot gas erosion on firing and the remaining layers comprise a tow of the material helically-wound at an average helix angle with respect to the barrel section axis of $\theta = \tan^{-1}(\sigma_{axial}/\sigma_{hoop})$ where $\sigma_{axial}$ and $\sigma_{hoop}$ are the axial and hoop stresses produced in the barrel section by axial and hoop loads respectively.

Other details and features of the present invention will become apparent from the description which follows.

DESCRIPTION OF THE PREFERRED EMBODIMENT

Figure 1:
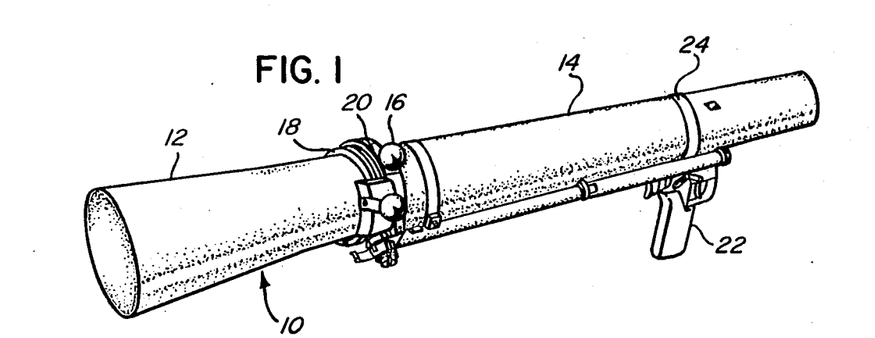
FIG. 1 illustrates in perspective a light recoilless gun (LRG) to which the present invention is applicable.

Turning to the drawings, FIG. 1 shows a structural element in the form of a recoilless weapon (LRF) 10. A venturi or diffuser section 12 and a barrel or pressure section 14 are coupled together by a breech assembly 16. The breech assembly 16 is totally conventional in form, and need not be further described here for an understanding of this invention. It is noted that the breech assembly 16 includes a two part base ring, whose parts 18 and 20 fixedly support the diffuser and pressure sections 12 and 14. The parts 18 and 20 are pivotally interconnected so as to provide for relative movement, and enable loading of the barrel section 14. This is clearly seen by comparing FIG. 1 in which the breech assembly 16 is closed, and FIG. 2 in which the breech assembly is open. The recoilless weapon 10 shown in FIGS. 1 and 2 includes a trigger and firing mechanism 22 supported from the pressure section 14 by a support strap or ring 24. These are also conventional in the recoilless weapons art and need not be further described here.

It has been found, as indicated in U.S. Pat. No. 4,485,721, that contrary to teachings of the prior art such as Canadian Pat. No. 582,160, a unitary barrel construction can be made from non-metallic fibre reinforced composite materials. Moreover, such a barrel need not use metal liners. Reinforcing fibres such as graphite (carbon), and beryllium, as well as glass have, in certain forms, greater superior strength and stiffness properties as compared to bulk metal such as steel, titanium or aluminum. It is known, of course, that alloys of those metals are commonly used in making gun barrels. As mentioned earlier, conventional wisdom previously required that barrels be made entirely of metal, or at least use a metal liner, overwrapped perhaps with reinforcing glass fibre.

As pointed out in U.S. Pat. No. 4,485,721 barrels acceptable for use in recoilless weapons can be made and used without the need for a liner, metallic or otherwise. Such a barrel is made in the form of a tubular structural element of a non-metallic fibre reinforced composite material and, depending on the requirement of the element, it may have interior projections (rifling or the like) integrally formed therewith.

In order to produce the desired barrel section it is necessary to first of all produce a mandrel on which the fibre-reinforced composite material will be wound and, after winding, cured to produce the desired element. Thus, in producing the mandrel, the volume and thermal expansibility of the mandrel material must be taken into account since the final dimensions of the mandrel are derived when both the mandrel and the composite material wound thereon are at curing temperatures. At room temperatures the dimensions of the mandrel will normally be somewhat less than those at curing temperatures.

Figure 2:
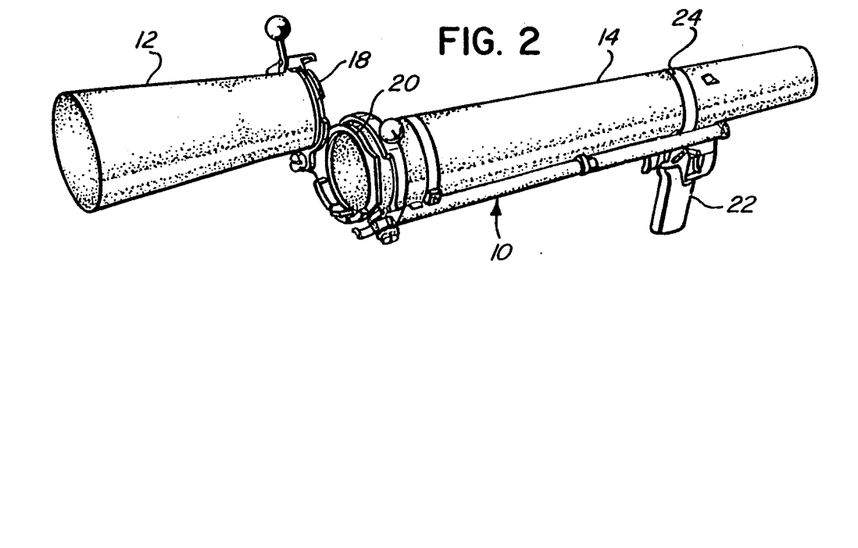
FIG. 2 shows the LRG of FIG. 1 in a "breech open" conditon, ready for loading or unloading.
Figures 3, 3A:
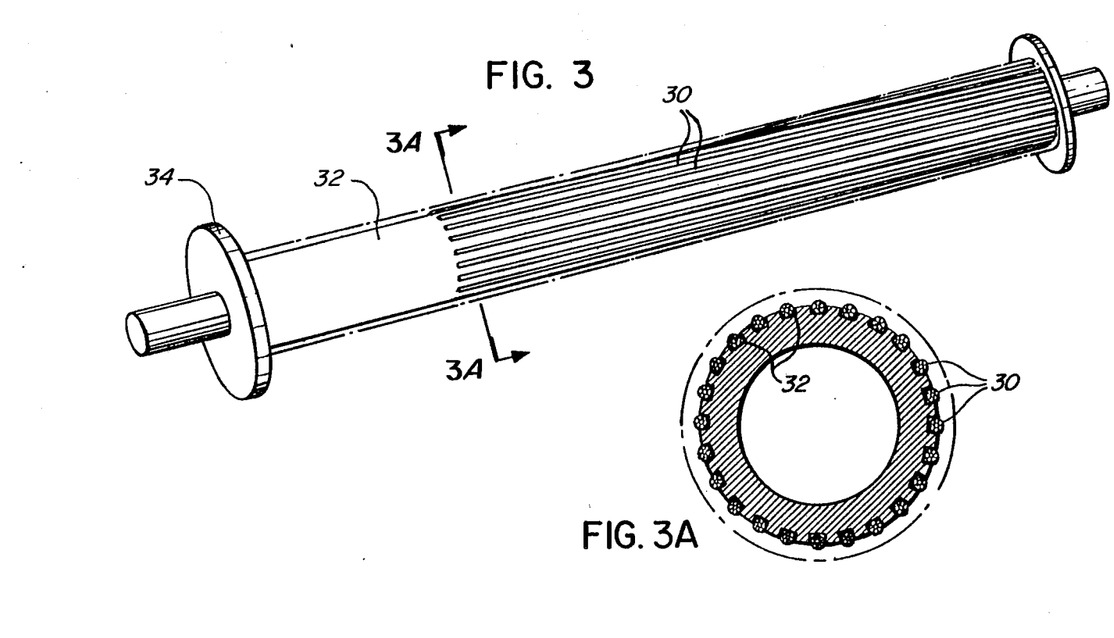
FIG. 3 illustrates one form of a mandrel for producing a barrel section for the LRG of FIG. 1.
FIG. 3A shows a cross-section on the line 3A—3A of FIG. 3.

FIGS. 3 and 3A illustrate a typical mandrel which might be used to produce a rifled barrel section, such as the pressure or barrel section 14 shown in FIGS. 1 and 2. The mandrel 34 is provided with a plurality of channels or grooves 32 in the surface thereof, the channels being generally rectangular in cross-section albeit with a slight narrowing towards the bottom thereof to accommodate, with a suitable release agent, easy removal of the barrel section after curing. The channels 32 extend generally longitudinally of the mandrel and slightly helically thereof. Typically, these channels are spaced equally apart around the circumference of the mandrel.

Figure 4:
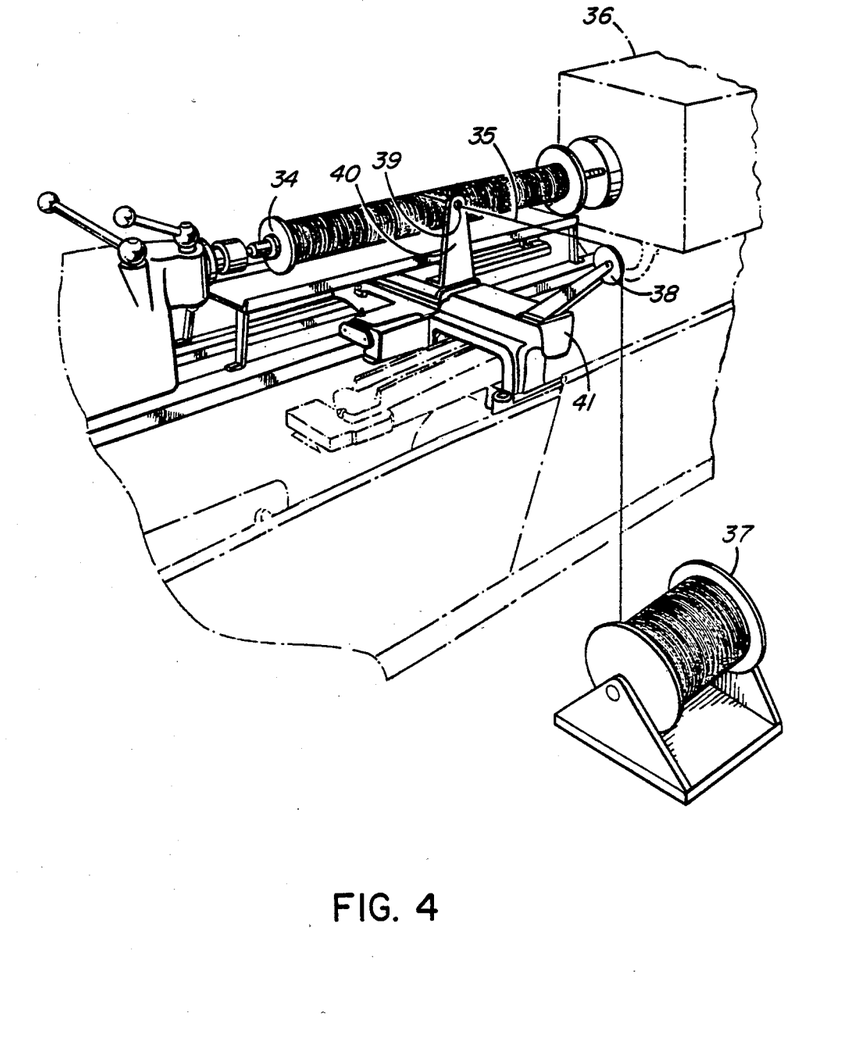
FIG. 4 shows a typical winding machine for producing a barrel section for the LRG of FIG. 1.

With particular reference to FIG. 3A, rovings 30 of the composite material, preferably a carbon fibre treated by coating or impregnated with an epoxy resin, are laid lengthwise in each of the channels 32 until there is a slight bulging of the material outwards of the mandrel surface. The mandrel 34 with the filled channels 32 is placed in the bed of an automatic, preferably computer controlled, winding machine, and a tow of the epoxy resin-treated carbon fibre material is wound thereon. FIG. 4 shows a simplified typical winding machine 36 in which the mandrel 34 is mounted. The tow of winding material comes from a spool 37 and is fed over a guide roller 38, through die hole 39 in a guide member 40 to the mandrel. The guide roller 38 and guide member 40 are mounted on a carriage 41 that moves along the bed of the machine 36 under the direction of the machine programme. Such programme can control the machine whereby the tow of composite material is wound on the mandrel at the desired constant tension, about 8 lbs., in the desired number of layers and at the desired angle. Further details of the machine need not be described as such machines are commercially available and do not form a part of the present invention.

The tow of carbon fibre material may have been impregnated or coated with a suitable epoxy resin before being wound on the spool 37, whereby no further operations on the tow are required. Alternatively a non-treated tow of carbon fibre material may be provided on the spool 37 and, as the tow is unwound from the spool, it may pass through the nip defined by a pair of kissing rollers (not shown) one of which rotates through an epoxy resin bath and thus transfers resin to the tow prior to winding on the mandrel.

Of considerable significance to the success of the present invention is the number of layers of tow used to produce the barrel section and the helix angle thereof relative to the longitudinal axis of the barrel section. It has been determined that by using particular combinations of helix angles for the wound tow in adjacent layers the efficacy of the resulting barrel section can be greatly altered. For the barrel section 14, produced on a mandrel such as mandrel 34 illustrated in FIGS. 3 and 3A, it has been determined that a particularly effective barrel is produced if the first four layers of tow are hoop-wound on the mandrel at a helix angle as close to 90° as possible and the remaining layers are wound at an average helix angle $\theta = \tan^{-1}(\sigma_{axial}/\sigma_{hoop})$ where $\sigma_{axial}$ and $\sigma_{hoop}$ are the desired axial and hoop strengths respectively of the barrel section. The layers at angle $\theta$ are wound onto the mandrel until the desired wall thickness is achieved, the wall thickness being determined by the composite strength and the appropriate ballistic pressure profiles. The wall thickness is also selected to provide a hoop stiffness ($E_h \times t_{wall}$) approximately equal to that of a steel barrel used in existing weapons. Adequate hoop stiffness is required for efficient operation of the barrel, as excessive diametral expansion under the operating pressure would lead to gas leakage past the projectile base, resulting in lower muzzle velocities. Furthermore, excessive diametral expansion would be followed by excessive diametral contraction which in turn would lead to an interfering fit between the cartridge case and the barrel, resulting in cartridge case removal difficulties.

Figure 6:
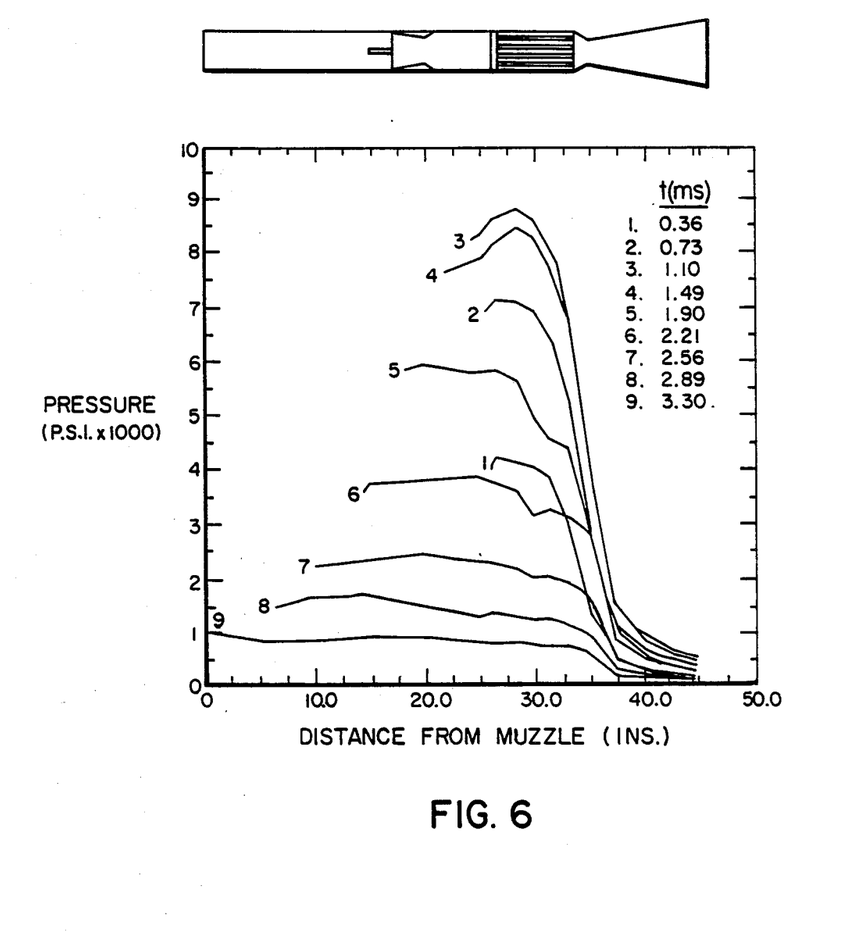
FIG. 6 provides a graph of ballistic pressure profiles within the LRG of FIG. 1 at various times during a firing.

FIG. 6 gives the interior ballistic pressure profiles at various times during a firing. Multiplying these profiles by approximately 1.5 to give a peak chamber pressure of 14,000 psi or 965 MPa will provide the design pressure profiles. Considering the frictional load on the barrel produced by the interaction of the projectile driving band and the barrel rifling, as well as the axial stresses resulting from the step-function pressure profile at the projectile base, leads to an estimated axial stress approximately $\frac{1}{3}$ the hoop stress. This in turn leads to an optimum value of $\theta$ of about 71°. A more detailed analysis of the theory leading to the optimum value of $\theta$ follows.

According to the literature, as in "Probabilistic Burst Strength of Filament-Wound Cylinders Under Internal Pressures", M. Uemura and H. Fukuraga, Journal of Composite Material, Vol. 15, 1981, experimental data and the use of standard failure criteria show the burst strength of carbon-fibre epoxy tubes to be critically dependent on the filament winding angle, the optimum angle for a closed-end tube being the classical 52.5° with the burst strength dropping by almost 50% at angles of 45° and 60°. Of greater interest however, is the strain data collected during burst tests of 3.5 inch diameter tubes and the strain data collected during firings of prototype recoilless guns incorporating features of the present invention. Tables 1 and 2 below tabulate the results of interest with $\theta$ being the average winding angle, the effective hoop modulus being the calculated hoop stress (PD/2t) divided by the measured hoop strain, and the hoop and axial strains being measured on the chamber region for the dynamic (firing) case. Hoop stresses were computed for the dynamic case by assuming the usual peak chamber pressure of 9,000 p.s.i.

TABLE 1

Parameters for Carbon-Fibre/Epoxy Tubes

| $\theta$ | Effective Hoop Modulus (psi × 10⁶) Static | Effective Hoop Modulus (psi × 10⁶) Dynamic | Burst Pressure (psi × 10³) | Burst Mode |
| --- | --- | --- | --- | --- |
| 62° | 7.8 | | ≈18 | hoop |
| 71.2° (Proto. #8) | 16.5 | 14.4 | 16.8 | hoop/axial |
| 75.3° (proto. #4) | | 18.0 | | |
| 84.1 (proto. #5) | 22.1 | | 10.3 | axial |

TABLE 2

Maximum Strains (in/in) on Carbon-Fibre/Epoxy Tubes

| | Static (at Burst) hoop | Static (at Burst) axial | Dynamic hoop | Dynamic axial (max) | axial (shot-start) |
| --- | --- | --- | --- | --- | --- |
| 62° | 0.0084 | −0.012 | | | |
| 71.2° (proto. #8) | 0.0072 | −0.0070 | 0.0033 | −0.0032 | 0.00080 |
| 75.3° (proto. #4) | | | 0.0045 | −0.0035 | 0.0023 |
| 84.1° (proto. #5) | 0.0033 | 0.0003 | | | |

Examination of Tables 1 and 2 shows that the effective hoop moduli for the static and dynamic cases compare quite well and that for $\theta = 71.2°$ (prototype #8) the dynamic strains are less than half the static strains at burst. The substantial safety margin of prototype #8 was substantially confirmed by proof pressure firings in which it did not fail at peak pressures of at least 12,000 p.s.i.

Figure 7:
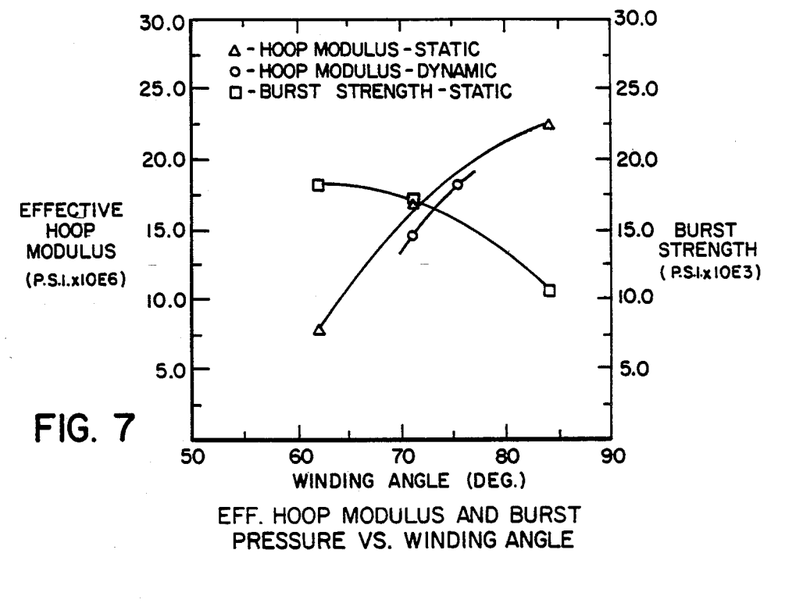
FIG. 7 is a graph showing the effective modulus of elasticity and burst pressure as a function of the winding angle.
Figure 8:
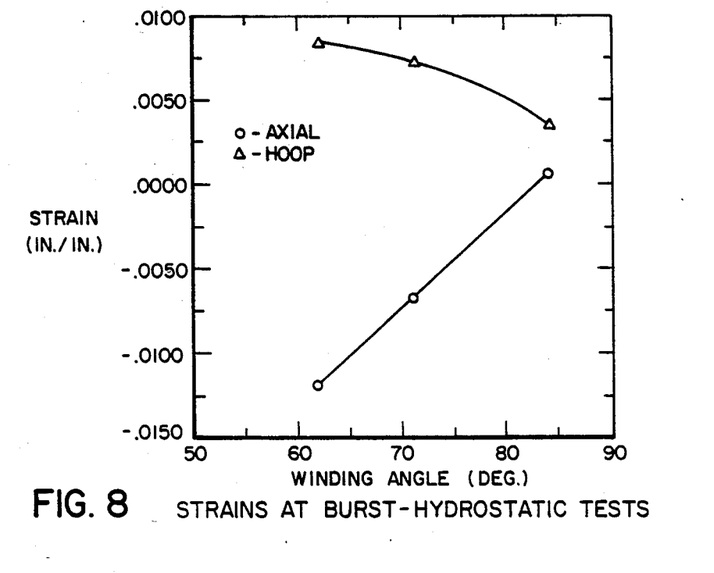
FIG. 8 is a graph showing the axial and hoop strains as a function of the winding angle.

FIGS. 7 and 8 plot the data of Tables 1 and 2 respectively and demonstrate the sensitivity of tube performance to winding angle. FIG. 7 also permits an approximate quantitative analysis of the results of winding at average angles other than 71.2°. For example, for $\theta = 67°$ the burst strength goes up slightly to 17,500 p.s.i. but the effective hoop modulus of elasticity drops to $12.2 \times 10^6$ p.s.i. (a 27% drop, meaning that a 27% thicker wall would be needed to maintain the same effetive hoop stiffness). For $\theta = 75°$ the reverse happens; the burst strength decreases by 11% to 15,000 p.s.i. and the affective hoop modulus increases to $17.5 \times 10^6$ p.s.i. Winding angles less than 71° are definitely sub-optimal. Winding angles greater than 71° may be acceptable but the upper cut off is not well defined by this analysis.

Another approach to defining the highest acceptable winding angle is to note that the measured maximum axial strains on prototypes #4 and #8 were approximately equal (Table 2) although they had different winding angles and different chamber wall thicknesses (0.194 in. for #4 and 0.340 in. for #8). The measured hoop strain for #8 multiplied by the ratios of effective hoop modulus and wall thickness predicts a maximum hoop strain of 0.0046 in/in for #4, compared with the measured value of approximately 0.0045 in/in and thus it is seen that the hoop strains do scale very well. The axial compressive strains do not scale with wall thickness or filament winding angle in the region $70° \leq \theta \leq 75°$ because they result from a Poisson-type coupling of the hoop strain to the axial strain and not from an axial loading per se. For example, in going from 71.2° to 75.3° for $\theta$, standard laminate analysis techniques show that the coefficient linking axial strain to hoop loading decreases by about 30% for a typical carbon fibre/epoxy tube.

Figure 9:
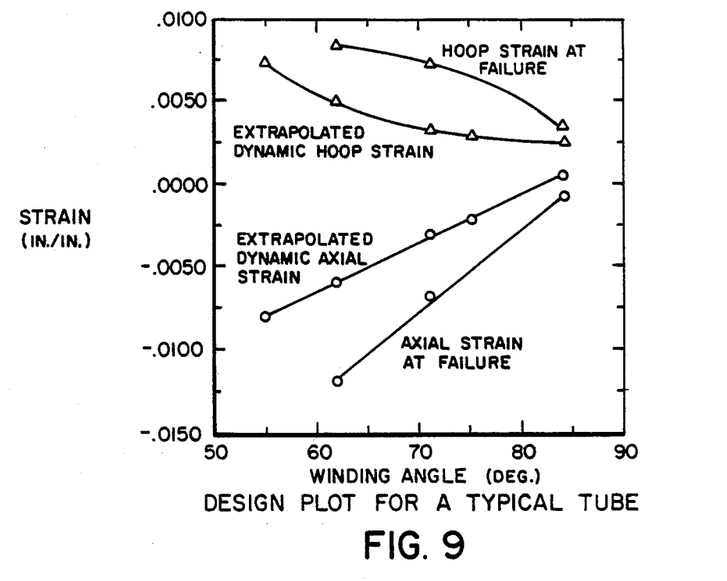
FIGS. 9 and 10 are graphs showing static and dynamic tensile strains as a function of the winding angle.
Figure 10:
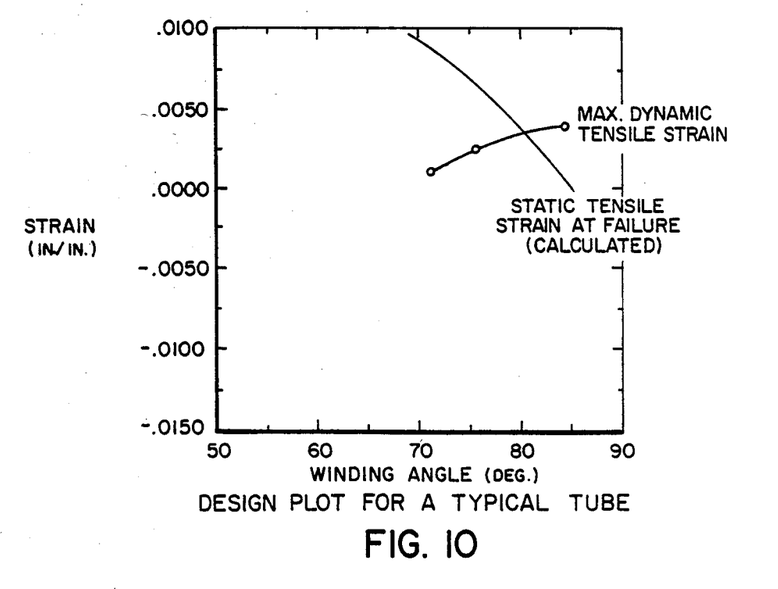

The use of standard laminate analysis techniques is useful in extrapolating the measured maximum axial and hoop strains to other winding angles, as shown in Table 3 and in FIGS. 9 and 10. As can be seen from the graphs of these figures an adequate margin of safety is only obtainable for $\theta \leq 78°$, this conclusion being supported by the burst strength plot of FIG. 7, the design pressure being $1.5 \times 8800 = 13,200$ psi. The upper bound is most clearly defined by the requirement for adequate strength to meet a combination of hoop and axial loadings which results in the dynamic tensile strains plotted in FIG. 10. The lower the ratio, the greater the dynamic tensile strains will be and the maximum winding angle will be lower. This is, of course, the same behaviour as obtained through the use of of $\theta = \tan^{-1}(\sigma_{hoop}/\sigma_{axial})$ and the "$\theta$" expression is thereby confirmed. The highest acceptable winding angle as determined by the general approach above is actually the optimum angle, as for it the highest effective hoop modulus is achieved and the thinnest wall can be used, thus achieving the lightest weight barrel.

In reviewing the above procedure it is important to bear in mind that the dynamic strain data are dependent on both system parameters and material properties, with the static strain data also being material property dependent. In general, carbon fibre/epoxy material properties can vary considerably as a function of both constituent material and fabrication parameters. The above discussion is therefore provided as an example which can be repeated for a particular application by those skilled in the art.

In summary, the practitioner of the present invention should consider the ratio of hoop to axial loadings, the desired safety margin below failure limits, and the desired hoop stiffness when choosing the winding angle(s). The range of useable angles is between 70° and 78°, the lower bound being defined by the hoop stiffness requirement, the upper bound being a result of failure of burst strength considerations.

TABLE 3

Maximum Dynamic Strains for a Typical Barrel (extrapolated from firing data for a barrel with $\theta = 71.2°$)

| $\theta$ | Hoop | Axial (tension)* | Axial (compression) |
|---|---|---|---|
| 55° | 0.0073 | −0.0057 | 0.0081 |
| 62° | 0.0049 | −0.0028 | 0.0061 |
| 71.2° | 0.0032 | 0.0008 | 0.0032 |
| 75.3° | 0.0028 | 0.0023 | 0.0023 |
| 84.1° | 0.0024 | 0.0037 | 0.0009 |

*at shot start

Notes
1. Assumed laminate properties are used, the extrapolations being made using standard laminate analysis techniques.
$E_{11}$ (modulus in direction of fibres) = $10 \times 10^6$ psi.
$E_{22}$ (modulus perpendicular to fibres) = $0.9 \times 10^6$ psi.
$G_{12}$ (shear modulus) = $0.6 \times 10^6$ psi.
$\gamma_{12}$ (Poisson's modulus) = 0.25
2. 34 laminate angle-plies with a total thickness of 0.28 inches are assumed.
3. Maximum internal pressure of 8,800 psi is assumed.
4. Axial strains in tension are estimated using a hoop/axial loadings ratio of 6.92:1.

After the desired number of layers have been wound on the mandrel, the mandrel is removed from the winding machine and placed in an oven for curing. The curing times and temperatures will of course depend on the materials used. After curing, the barrel section is removed by applying pressure and sliding it longitudinally of the mandrel. Some machining or similar processing of the exterior surface may be required to provide a more uniformly smooth/configured shape. For example, with reference to FIG. 5 it can be seen that at one end of the barrel section a threaded section 42 is created to receive the appropriate breech portion 20 and that other circumferential grooves 43 or shoulders are provided, perhaps for the assembly to the barrel section of specific components, such as a sight, the trigger mechanism or a shoulder rest.

Figure 5:
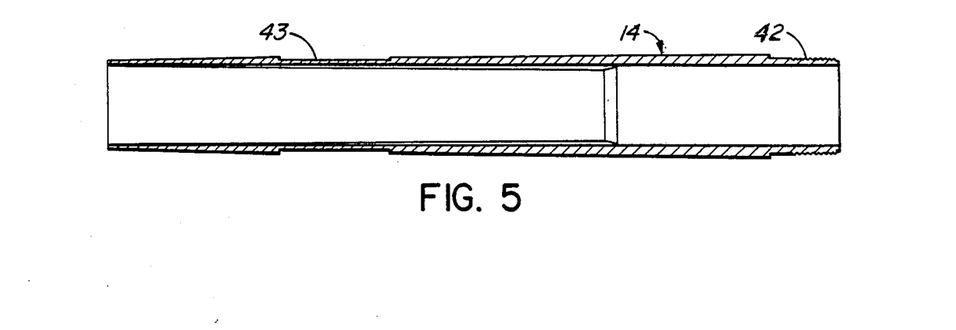
FIG. 5 shows a longitudinal cross-section of a typical barrel section of the LRG of FIG. 1.

As seen in FIG. 6 the maximum pressures on firing occur in the breech area as would be expected. Consequently the barrel strength and stiffness should be greatest towards the breech end of the barrel or pressure section 14. By ensuring that the strength and stiffness meet or even exceed the comparable values for a conventional gun it is possible to reduce the potential for cartridge casing sticking, a phenomenon which occurs due to different rates of expansion and contraction of the barrel and the cartridge casing. Since the strength and stiffness near the muzzle end of the barrel need not be as great as near the breech end it is possible to reduce the amount of tow required by tapering the outside surface of the barrel section as shown in FIG. 5. Thus, on the basis of a winding or layer thickness of 0.0065 inches an appropriate taper could be achieved by winding one less layer of tow for each 0.3 inches of barrel length, starting from an appropriate point such as about 11 inches from the breech. That would give a barrel thickness of about 0.340 inches at the breech end and a thickness of about 0.125 inches at the muzzle end.

For both the barrel section 14 and the venturi section 12, the threaded connection to the corresponding breech portion 20 and 18 may be filled with epoxy resin to prevent high pressure gases from entering the threaded connections during firing and forcing the components apart. Each threaded portion is sufficiently long to transmit expected axial and shear loads.

In summary, the present invention relates to the construction of barrel sections for guns subjected to high internal pressures on firing and represents an improvement over barrel sections, and the method of producing such barrel sections, as disclosed in U.S. Pat. No. 4,485,721. Specifically, the present invention utilizes a tow of carbon fibres in a matrix of a low-viscosity, thermosetting epoxy resin, with the two being wound on a mandrel in a particular configuration to obtain a barrel section having the desired properties of stiffness, strength, lightness and relatively long life. At least the innermost layer or layers are provided primarily to minimize hot gas erosion and the remaining layers are wound to an optimum helical angle relative to the barrel axis. The optimum helix angle is in the vicinity of 71°, although a range of about 70° to 78° is acceptable. Preferably, the hot gas erosion preventing material comprises at least four layers of tow hoop wound on the mandrel at about 90°. Barrel sections produced in accordance with the present invention have been able to fire upwards of 30 rounds of ammunition before failing and such represents a considerable improvement over existing weapons produced by conventional methods which fail after the firing of 5 to 10 rounds. In addition to having a longer effective life, weapons using barrel sections produced in accordance with this invention are substantially lighter in weight than conventionally-produced weapons and they are also less expensive to produce.

While the foregoing has disclosed the basic features of the present invention it is clear that alternative configurations or changes could be effected by a person skilled in this art without departing from the spirit of the invention. Thus, the protection to be afforded the invention is to be determined from the claims appended hereto.

The embodiments of the invention in which an exclusive property or privilege is claimed are defined as follws:

1. A barrel section for a lightweight weapon system subjected to high transient internal pressures and temperatures on firing, comprising a cured resin-treated multi-filament carbon fibre material which has been provided in a plurality of superimposed layers along the length of said section whereby at least the innermost layer of said material is configured to resist hot gas erosion on firing, the remaining layers comprise a tow of said material helically-wound at an average helix angle with respect to the barrel section axis of $\theta = \tan^{-1}(\sigma_{axial}/\sigma_{hoop})$ where $\sigma_{axial}$ and $\sigma_{hoop}$ are the axial and hoop stresses produced in the barrel section by axial and hoop loads respectively, and the thickness of the remaining layers provides a hoop stiffness equivalent to that of a steel barrel.

2. The barrel section of claim 1, wherein $\theta$ lies in the range of 70° to 78° to the section axis.

3. The barrel section of claim 1, wherein $\theta$ is approximately 71° to the section axis.

4. The barrel section of claim 1, including, adjacent one end thereof, a plurality of external threads for connection to a breech portion of said weapon system.

5. The barrel section of claim 1, wherein the wall thickness of the barrel section is sufficient to provide said barrel section with a desired hoop stiffness.

6. The barrel section of claim 1 wherein at least said innermost layer comprises a fabric formed of said carbon fibre material.

7. The barrel section of claim 6 wherein the outer diameter of said section progressively decreases from a zone adjacent a breech end thereof to a zone adjacent a muzzle end thereof.

8. The barrel section of claim 1 wherein at least the innermost four layers comprise a portion of said tow which has been hoop-wound at approximately 90° to said barrel section axis, the remaining layers comprising said helically-wound layers.

9. The barrel section of claim 8 including a plurality of longitudinally extending spiral rifling grooves within said section, said grooves being defined by a plurality of inwardly directed projections formed from elongated rovings of said tow and bound to said barrel section during the curing of said resin.

10. A method of producing a barrel section for a lightweight weapon system subjected to high transient internal pressures and temperatures on firing, comprising the steps of:
    (a) preparing an epoxy resin-treated multi-filament carbon fibre material;
    (b) winding said material on a mandrel configured to the internal configuration of the desired barrel section to create initially at least one layer of said material configured to resist hot gas erosion on firing and subsequently a plurality of superimposed layers of a tow of said material helically wound about the at least one layer at a helix angle with respect to the mandrel axis of $\theta = \tan^{-1}(\sigma_{axial}/\sigma_{hoop})$ where $\sigma_{axial}$ and $\sigma_{hoop}$ are the desired axial stresses respectively of the barrel section and winding the tow of material in sufficient thickness to provide a hoop stiffness equivalent to that of a steel barrel;
    (c) curing said superimposed layers of material; and
    (d) removing said mandrel from the cured barrel section.

11. The method of claim 10 wherein said gas erosion resisting layer comprises a fabric formed from said material.

12. The method of claim 10, wherein said helix angle $\theta$ is in the range of 70° to 78° to said mandrel axis.

13. The method of claim 10, wherein said helix angle $\theta$ is approximately 71° to said mandrel axis.

14. The method of claim 10 including the step of machining a plurality of external threads in the outer surface of said barrel section adjacent one end thereof, for connection to a breech portion of said firearm.

15. The method of claim 10, comprising the step of, during step (b) decreasing the axial length of succeeding helically wound layers from adjacent a muzzle end of said barrel section whereby the external diameter of said barrel section progressively increases from a minimum adjacent said muzzle end to a maximum adjacent the other end thereof.

16. The method of claim 10, wherein the desired hoop stiffness of the barrel section is the product of the wall thickness and the modulus of elasticity of said material in the hoop direction.

17. The method of claim 10 wherein a portion of said tow is initially hoop-wound on said mandrel at about 90° to the mandrel axis to create at least four hot gas erosion resisting layers.

18. The method of claim 17 wherein said mandrel is generally cylindrical in cross-section and includes a plurality of circumferentially spaced apart and longitudinally extending spiral grooves in the outer surface thereof and, prior to step (b), a plurality of rovings of said tow is positioned to fill each such groove whereby during step (c) said rovings are bound to said hoop-wound layers of tow to create inwardly directed projections within said barrel section defining rifling grooves therebetween.

19. The method of claim 17 wherein step (a) includes the steps of winding a tow of multi-filament carbon-fibre material on a spool, positioning said spool adjacent a winding machine adapted to perform step (b), and passing said tow through epoxy-resin applying means as it is fed from said spool to said machine.

20. The method of claim 17 including the step of maintaining said tow under a tension of approximately 8 lbs as it is wound on said mandrel.

* * * * *